Dec. 23, 1958    P. LEBOUCHER    2,865,336
HYDRAULIC BOOSTER MECHANISM
Filed Jan. 13, 1955

INVENTOR.
PAUL LEBOUCHER
BY Malcolm W. Fraser
ATTORNEY

# United States Patent Office 2,865,336
Patented Dec. 23, 1958

2,865,336

HYDRAULIC BOOSTER MECHANISM

Paul Leboucher, Paris, France

Application January 13, 1955, Serial No. 481,595

Claims priority, application France January 22, 1954

1 Claim. (Cl. 121—41)

Auxiliary control systems which are intended for the transmission of movement to the steering wheels of vehicles, control surfaces of aircraft and the like are well known in the art. They include two chief independent parts, to wit: a distributor which is actuated directly or otherwise by the operator for adjusting the distribution of the controlling fluid and a jack which transmits the operative stress to the parts to be controlled in the desired direction. The presence of such two separate parts form already a drawback per se. Furthermore, such systems require a considerable number of channels or pipes outside them for the input and output of the control fluid and also often a comparatively intricate linkage for the transmission of movement between the two parts.

My invention has for its object to produce an arrangement of the type disclosed hereinabove, appearing in the form of a compact unit which is mechanically resistant and may be readily fitted on a vehicle or the like machine without requiring any transformation of the latter.

A further object of the invention consists in executing an apparatus of the type disclosed wherein there is no inoperative period at the moment of the change in the direction of movement of the controlled part.

A still further object of the invention consists in executing a system of the type referred to wherein the operator may produce the desired control without any change in the arrangement of the system considered whenever there is a lack of control fluid for any reason whatever and without any of the delicate components of the distributor being submitted thereby to any strain.

With a view to reaching the above advantageous objects, I provide, for the distribution of the controlling fluid to the jack acting on the part to be controlled, a distributor housed inside the piston of the controlling jack.

Further advantageous features of my invention will appear in the reading of the following description, reference being made to accompanying drawings given by way of exemplification and by no means in a limiting sense. In said drawings.

Figure 1:
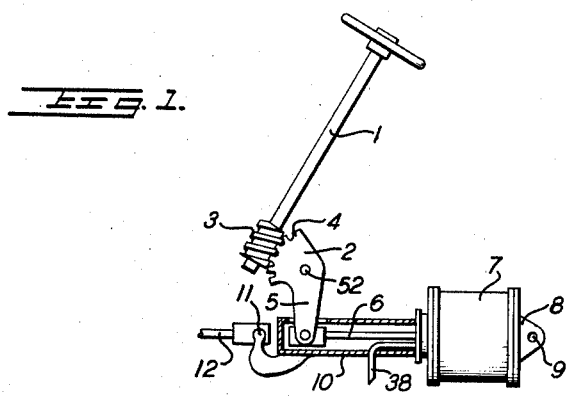
Fig. 1 is a diagrammatic side view, partly sectional, of the control system for the steering wheel of a vehicle, designed in accordance with a particular application of my invention.

As illustrated in Fig. 1, the steering column 1 acts on the usual lever 2 through cooperation between the worm 3 on the column and the toothed sector 4 cut along the periphery of the end of the lever 2. The opposite arm 5 of the lever 2 is pivotally secured, in a manner disclosed hereinafter in full detail with reference to Fig. 3, to the rod 6 controlling the distributor of the auxiliary control system 7. The strap 8 provided with an opening 9 serves for pivotally securing said auxiliary control system to any desired stationary point of the vehicle. The hollow rod 10 described with further detail hereinafter and which projects out of said system 7 is connected in its turn through a ball and socket joint 11 of a conventional type with the part to be controlled 12, said part being constituted for instance by the steering bar of the vehicle.

The distributor of the control system 7 is actuated by movement of rod 6 in either direction through manual operation of the steering wheel and actuation of intermediate parts 3—4—2—5.

The rod 6 may be returned into its neutral position which position corresponds to the running of the vehicle along a straight line, through the direct action of the driver holding the steering wheel in its neutral position. This return into neutral position may be furthered by the arrangement illustrated in Fig. 2 which shows the pivotal connection between the rod 6 and the end 5 of the lever 2. said rod 6 may be provided with an annular collar 39 and, between said collar 39 and two annular abutments 40 and 41 inwardly rigid with the inner surface of the hollow rod 10, there are located corresponding tensioned springs 42—43 which bear through two annular rings 44 and 45 against the collar 39. In the position of equilibrium, i. e., in the position illustrated in Fig. 2, the annular collar 39 registers with an annular stop 46 rigid with the inner surface of the hollow rod 10.

Figure 2:
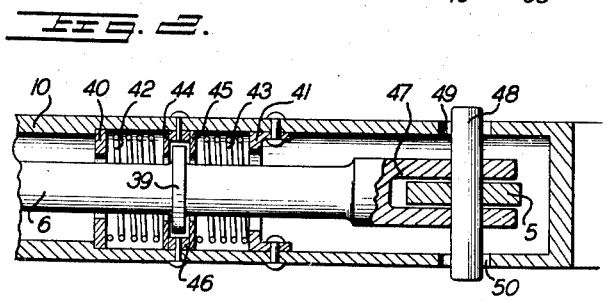
Fig. 2 is a sectional view of a detail of Fig. 1.

When the rod 6 moves in either direction, it compresses the corresponding spring 42 or 43 which has consequently a tendency to return the rod 6 into the position of equilibrium illustrated in Fig. 2 as soon as the driver ceases shifting the steering wheel out of its neutral position. Said rod 6 ends with a yoke or strap 47 fitted over the end 5 of the lever 2 and revolubly mounted on a spindle 48 rigid with said end 5 of the lever 2 and extending perpendicularly to the plane of the latter. Said spindle 48 passes also through elongated openings 49—50 formed in the wall of the rod 10 at diametrically opposed points thereof, whereby a slight clearance is allowed for said spindle 48 to either side of its medial position.

This manner of mounting the rod 10 leads to the following advantages:

When the driver turns the steering wheel, he has no effort to exert for a small angular displacement because the toothed sector 4 is connected with the steering bar with a slight clearance provided by the elongated openings 49 and 50, said play or clearance being larger than that required for the operation of the distributor. Consequently, the distributor is operated before the spindle 48 can shift the hollow rod 10. By reason of this coupling system, the driver may still steer his vehicle in the absence of any control fluid. In this case, the rod 6 moves without any effort and the spindle 48 abuts against the corresponding end of the elongated opening 49—50 so as to drive the rod 10 and consequently the ball and socket joint 11 whereby the steering bar 12 is shifted, these movements continuing as long as the driver exerts a turning effort on the steering wheel.

It will be remarked that, in the arrangement disclosed, the ball and socket joint 11 is aligned with the axis of the auxiliary control system, which cuts out any flexional stress on the hollow rod 10.

Figure 3:
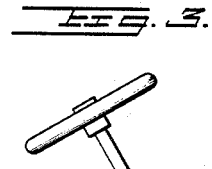
Fig. 3 illustrates an embodiment of the auxiliary control system according to my invention.
Figure 4:
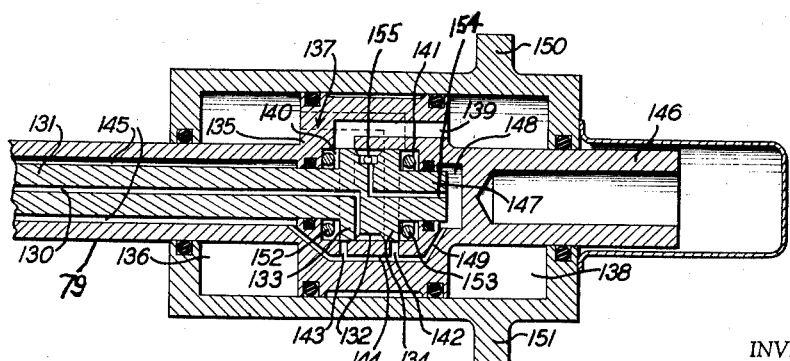
Fig. 4 is a sectional view of the auxiliary control means.

Fig. 3 illustrates an embodiment which is more particularly applicable when the controlling fluid is a liquid such as oil. Said embodiment includes an outer cylinder 76 which is pivotally secured to a stationary point through the ring 77 rigid with its cover. Inside said cylinder, a piston 135 is slidingly carried, as illustrated in Fig. 4, said piston 135 carrying an integral extension in the shape of a hollow rod 79, inside which is housed the rod 80 acting on the distributor, as described in detail hereafter. Since the oil is to flow through the annular channel 81 constituted by the gap separating the hollow rod 79 from the inner rod 80, there is provided a packing ring 82 (Fig. 3) between said two rods.

Turning to Fig. 4, in the embodiment illustrated therein oil under pressure is admitted, through an axial channel 130 formed in the rod 131 controlling the distributor, into the annular compartment 132 extending between the two collars 133 and 134. It is fed either into the chamber 136 on the left hand side of the main piston 135 through the channel 137 or else into the chamber 138 on the right hand side of the said piston through the channel 139. In said embodiment, the distributor compartments 140 and 141 are located respectively to the left hand side of the collar 133 and to the right hand side of the collar 134. These two compartments 140 and 141 may communicate with the container of oil to exhaust fluid through the ports 142 and 143 adapted to be uncovered by the collars 133 and 134 during their movement. These two ports open into the channel 144 in turn opening into the annular channel 145 leading to said oil container.

The two collars 133 and 134 are narrower than the openings of the channels 137 and 139 and, since the clearance in the distributing system is very small, the compartment 140 communicates permanently with the compartment 138 and similarly the chambers 141 and 136 are in constant communication. Consequently, the two compartments 140 and 141, instead of being in permanent communication with the container in the oil distribution system, are constantly submitted to the same hydraulic pressure as the chambers 136 and 138 respectively. The rod 131 controlling the distributor is consequently submitted to a resistant stress which is exactly proportional to the stress applied to the main piston which moves in the same direction and closes the oil admission port after it has overtaken the distributing slide valve.

In order to equalize the stresses transmitted in both directions and also the reactions to which the operator is submitted, the main piston 135 includes an extension formed by the rod 146 projecting into the outer atmosphere while the distributor slide valve includes an extension formed by the rod 147, said rod 147 moving inside the chamber 148 which is connected with the channel 144 through the passageway 149 and consequently communicates with the oil container through the agency of said channel 144 and of the annular channel 145. The arrangement may revolve round the cooperating aligned studs 150 and 151. The presence of the two slightly compressible tore-shaped packings 152 and 153 in the compartments 140 and 141 furthers the shifting of the distributor, starting from its neutral position and allows providing the collars 133 and 134 with a slight overlap during admission so as to cut out any loss of pressure when the auxiliary control system is inoperative. To permit the piston to move freely and without undue resistance in the event a loss of hydraulic fluid pressure occurs, a duct 154 is provided in the extension rod 147 of the distributor, which communicates with the chamber 148 at one end and through a check valve 155 with the annular compartment 132 at the other end. Thus, pressure fluid will flow from chamber 148 into compartment 132 by opening the valve 155. This permits free movement of fluid from one piston chamber to the other when the auxiliary power booster is not operative and manual control is required. In normal operation the fluid under pressure in annular compartment 132 maintains the valve 155 closed.

What I claim is:

An hydraulic booster mechanism comprising a fixedly mounted hollow cylinder, a piston reciprocable in said cylinder and defining therewith piston chambers on each side of said piston, a hollow piston rod connected to one end of said piston and connected at its opposite end to a member the movement of which is powered and controlled thereby, a coaxial control rod carried within said piston rod, a movable distributor for hydraulic fluid supply to and exhaust from said piston located within said piston and connected to and actuated by said control rod, said control rod having an axial duct for admission of fluid under pressure, an annular fluid exhaust duct of larger cross section than said axial admission duct defined by the space between the piston rod and control rod, an annular fluid supply chamber in said distributor communicating with said axial duct in the control rod, said piston having separate channels, of enlarged cross section relative to said axial supply duct communicating with said piston chambers, said annular supply chamber being adapted to alternately communicate with said channels upon movement of said distributor in one or other direction from a neutral non-communicating position to supply fluid under pressure to one or the other of the piston faces, annular collars on said distributor on either side of said annular supply chamber having widths less than the diameters of said piston channels, annular exhaust chambers in said distributor on either side of said collars, one each of said chambers permanently communicating with a respective piston channel whereby each chamber presents an area exposed to the pressure fluid in the corresponding piston channel, the annular exhaust chambers alternately communicating with exhaust ports in said piston having enlarged cross sections relative to said axial supply duct, and an exhaust channel in said piston connecting said exhaust ports with said annular fluid exhaust duct, whereby slight movement of said distributor in either direction from neutral position admits fluid under pressure to one of said piston chambers and exhausts relatively pressureless fluid from the other piston chamber through the above-described exhaust means.

References Cited in the file of this patent

UNITED STATES PATENTS

| | | |
|---|---|---|
| 1,365,347 | Schneider | Jan. 11, 1921 |
| 1,628,603 | Ferris | May 10, 1927 |
| 1,831,737 | Broussouse | Nov. 10, 1931 |
| 1,848,923 | Almen | Mar. 8, 1932 |
| 2,212,955 | Price | Aug. 27, 1940 |
| 2,393,585 | Boynton | Jan. 29, 1946 |
| 2,472,236 | Thomas | June 7, 1949 |
| 2,660,255 | Schindler | Nov. 24, 1953 |
| 2,686,569 | Bruce | Aug. 17, 1954 |
| 2,757,748 | MacDuff | Aug. 7, 1956 |

FOREIGN PATENTS

| | | |
|---|---|---|
| 751,362 | France | June 19, 1933 |